United States Patent
Gronowicz, Jr. et al.

(10) Patent No.: US 9,601,909 B2
(45) Date of Patent: Mar. 21, 2017

(54) PROTECTIVE ENCLOSURE FOR A WIRE HARNESS

(71) Applicant: Yazaki North America, Inc., Canton, MI (US)

(72) Inventors: William Gronowicz, Jr., Westland, MI (US); John Holthus, South Lyon, MI (US)

(73) Assignee: YAZAKI NORTH AMERICA, INC., Canton, MI (US)

( * ) Notice: Subject to any disclaimer, the term of this patent is extended or adjusted under 35 U.S.C. 154(b) by 0 days.

(21) Appl. No.: 14/243,963

(22) Filed: Apr. 3, 2014

(65) Prior Publication Data

US 2015/0288155 A1 Oct. 8, 2015

(51) Int. Cl.
*H02G 3/04* (2006.01)
*H01B 7/00* (2006.01)
*B60R 16/02* (2006.01)

(52) U.S. Cl.
CPC ......... *H02G 3/0406* (2013.01); *H01B 7/0045* (2013.01); *H02G 3/0468* (2013.01); *H02G 3/0481* (2013.01); *B60R 16/0215* (2013.01)

(58) Field of Classification Search
USPC ......................................... 174/68.3
See application file for complete search history.

(56) References Cited

U.S. PATENT DOCUMENTS

| 4,748,060 | A | * | 5/1988 | Fry | F16L 59/022 |
| | | | | | 138/151 |
| 4,951,740 | A | * | 8/1990 | Peterson | F28D 15/046 |
| | | | | | 165/104.26 |
| 5,534,906 | A | * | 7/1996 | Yamada | B41J 2/325 |
| | | | | | 347/171 |
| 5,796,035 | A | | 8/1998 | Walker | |
| 5,967,194 | A | * | 10/1999 | Martin | B60R 16/0215 |
| | | | | | 138/110 |
| 6,060,663 | A | | 5/2000 | Hier et al. | |
| 6,649,828 | B2 | | 11/2003 | Rockney et al. | |
| 6,774,312 | B2 | * | 8/2004 | Fatato | F16L 3/26 |
| | | | | | 138/122 |

(Continued)

FOREIGN PATENT DOCUMENTS

| CN | 101276663 A | 10/2008 |
| CN | 101466600 A | 6/2009 |

(Continued)

*Primary Examiner* — Dhirubhai R Patel
(74) *Attorney, Agent, or Firm* — Remarck Law Group PLC

(57) ABSTRACT

A convoluted tube for enclosing a wire harness can include a tubular body portion extending in a longitudinal direction. The tubular body portion can define a slit that extends in the longitudinal direction and that separates first and second contact surfaces of the tubular body portion. The convoluted tube can also include a conductive ink coupled to at least one of the first and second contact surfaces. The conductive ink can be configured to generate heat when an appropriate magnetic field is applied. The first contact surface can be configured to fuse with the second contact surface upon application of the appropriate magnetic field to the conductive ink such that the wire harness enclosed within the interior of the tubular body portion does not extend through the slit.

20 Claims, 4 Drawing Sheets

(56) References Cited

U.S. PATENT DOCUMENTS

| | | | |
|---|---|---|---|
| 6,843,276 B2 * | 1/2005 | Tadokoro | H02G 3/0468 138/121 |
| 8,592,685 B2 | 11/2013 | Kamenoue | |
| 2006/0105124 A1 | 5/2006 | Kikuchi | |
| 2008/0092974 A1 | 4/2008 | Gleeson | |
| 2009/0023009 A1 | 1/2009 | Yamaguchi | |
| 2010/0068477 A1 | 3/2010 | Barlow | |

FOREIGN PATENT DOCUMENTS

| CN | 101960686 A | 1/2011 |
|---|---|---|
| WO | 9304926 A1 | 3/1993 |
| WO | 2007121164 A2 | 10/2007 |

* cited by examiner

PROTECTIVE ENCLOSURE FOR A WIRE HARNESS

FIELD

The present disclosure relates to a wire harness enclosure and, more particularly, to an improved wire harness enclosure that provides for simple insertion of the wire harness and improved protection of the wire harness after insertion.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A wire harness in a vehicle can be exposed to harsh environments. In order to protect the wire harness, the wire harness can be arranged within an enclosure. Such a wire harness enclosure may take the form of a tube, e.g., a convoluted tube, through which the wire harness passes. A typical convoluted tube includes an opening at each end through which the wire harness must be inserted, which is a difficult and cumbersome process.

In order to simplify the insertion of the wire harness, the convoluted tube may include an opening or "slit" that permits the wire harness to be inserted into the interior of the enclosure. Unfortunately, the slit also provides an opening for dirt, dust and/or other potentially harmful environmental articles to enter and possibly interfere with the wire harness. Furthermore, the wire harness may "poke through" the slit when the convoluted tube is installed in the vehicle, for example, during bending or other manipulation of the wire harness.

In order to protect the wire harness, a tape or other wrapping may be spirally wrapped around the wire harness enclosure after insertion of the wire harness. This wrapping adds extra cost and weight to the wire harness, and also increases the complexity of the installation process.

It would be beneficial to provide a wire harness enclosure that allows for the simple insertion of the wire harness, while also providing a substantially sealed enclosure without additional wrapping or tape.

SUMMARY

In various embodiments of the present disclosure, a convoluted tube for enclosing a wire harness is disclosed. The convoluted tube can include a tubular body portion extending in a longitudinal direction. The tubular body portion can define a slit that extends in the longitudinal direction and that separates a first contact surface of the tubular body portion from a second contact surface of the tubular body portion. The convoluted tube can also include a conductive ink coupled to at least one of the first contact surface and the second contact surface. The conductive ink can be configured to generate heat when an appropriate magnetic field is applied to the conductive ink. The tubular body portion can be configured to enclose the wire harness within an interior defined by the tubular body portion by receiving the wire harness through the slit. Further, the first contact surface can be configured to fuse with the second contact surface upon application of the appropriate magnetic field to the conductive ink such that the wire harness enclosed within the interior of the tubular body portion does not extend through the slit.

In other embodiments, an enclosure for a wire harness can include a hollow body portion and a conductive ink. The hollow body portion can have a length, a first contact surface and a second contact surface. The hollow body portion can define a slit that extends the entire length of the hollow body portion. The slit can separate the first contact surface from the second contact surface. The conductive ink can be coupled to at least one of the first contact surface and the second contact surface. The conductive ink can be configured to generate heat when an appropriate magnetic field is applied to the conductive ink. The first contact surface can be configured to fuse with the second contact surface upon application of the appropriate magnetic field to the conductive ink.

In further embodiments, a convoluted tube for enclosing a wire harness can include a tubular body portion and a conductive ink. The tubular body portion can extend in a longitudinal direction and have a first contact surface and a second contact surface. The tubular body portion can also define a slit that extends in the longitudinal direction and that separates the first contact surface from the second contact surface. The tubular body portion, the first contact surface and the second contact surface can be formed of a single material. The conductive ink can be coupled to at least one of the first contact surface and the second contact surface. Further, the conductive ink can be configured to generate heat when an appropriate magnetic field is applied to the conductive ink. Additionally, the tubular body portion can define an interior space and be configured to receive the wire harness into the interior space through the slit. The single material can soften at the first contact surface and the second contact surface in response to the heat generated when the appropriate magnetic field is applied to the conductive ink such that, when the heat is removed, the first contact surface is fused with the second contact surface. The wire harness can be enclosed within the interior space of the tubular body portion such that it does not extend through the slit when the first contact surface is fused with the second contact surface.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
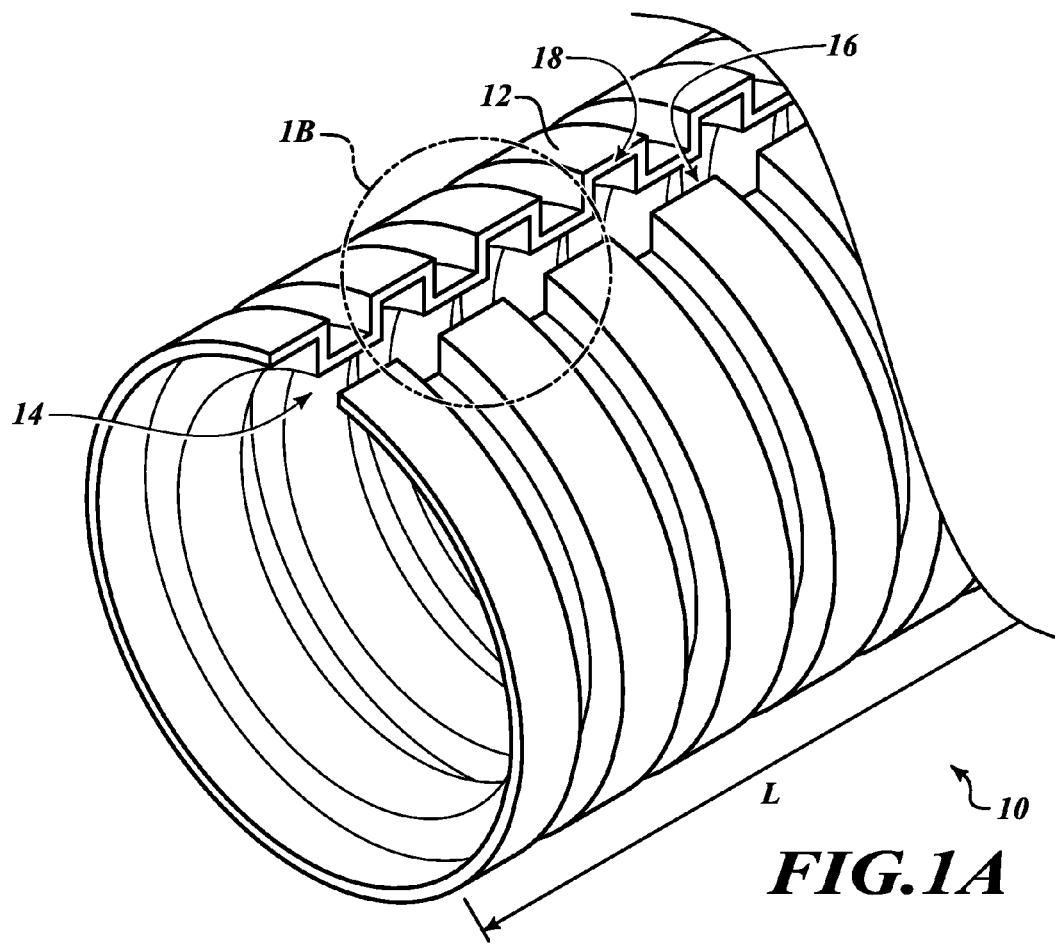
FIG. 1A is a partial perspective view of an example wire harness enclosure according to some implementations of the present disclosure.
Figure 1B:
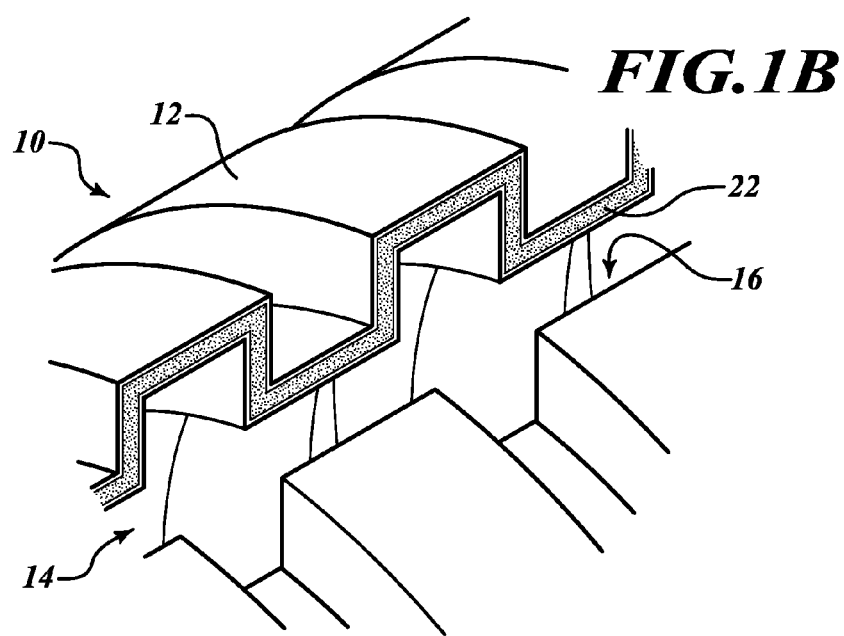
FIG. 1B is an enlarged view of the example wire harness enclosure of FIG. 1A at the location marked 1B.
Figure 2:
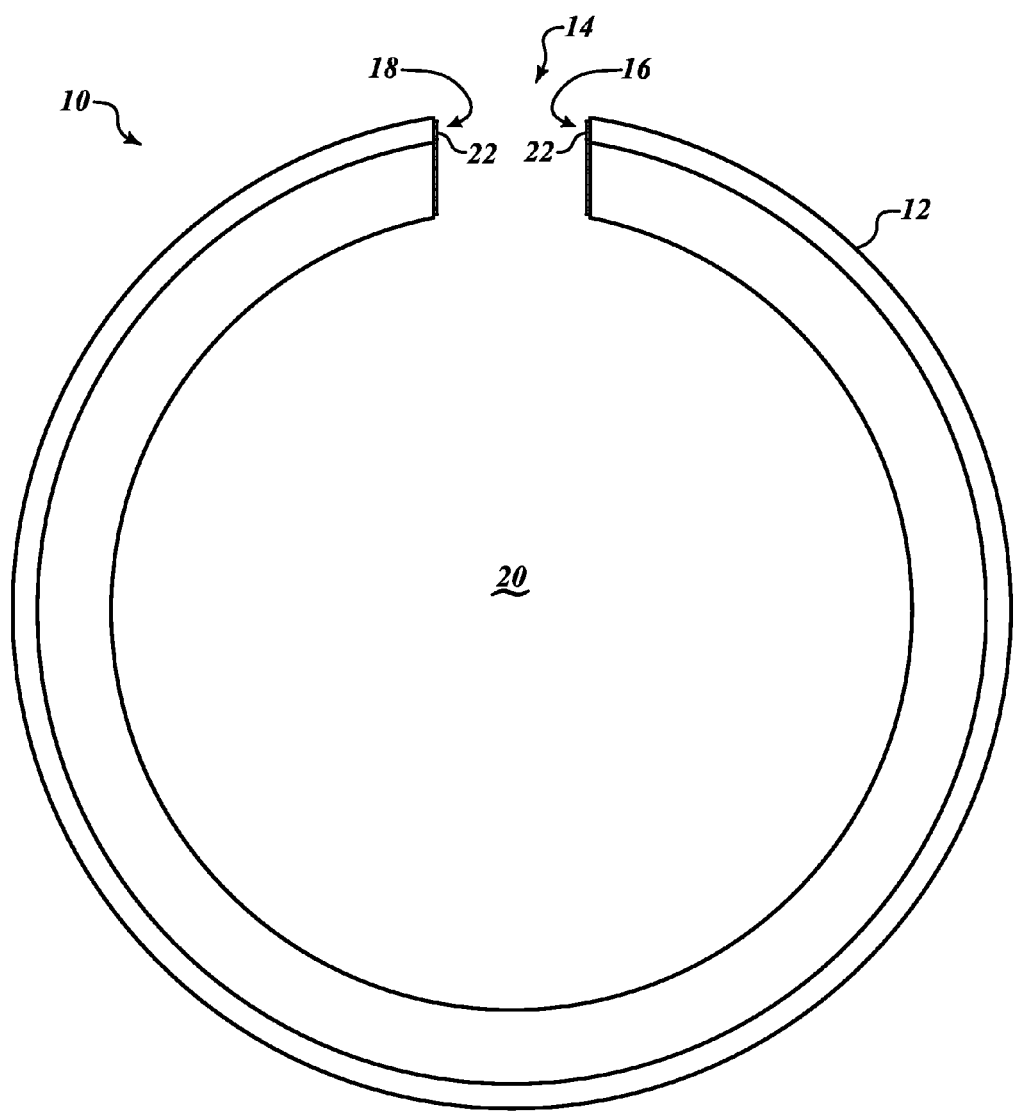
FIG. 2 is a cross-sectional view of the example wire harness enclosure of FIG. 1 taken along line 2-2.

Referring now to FIGS. 1A, 1B and 2, an example wire harness enclosure 10 according to some implementations of the present disclosure is illustrated. The illustrated example enclosure 10 is a convoluted tube that encloses a wire harness assembly. The enclosure 10 includes a hollow body portion 12 that has a length L in the longitudinal direction. The hollow body portion 12 can, for example only, have a tubular structure. In the illustrated example, the hollow body portion 12 is a tubular body portion that has a substantially circular shaped cross-section, although the cross-section can have other shapes (oval shaped, square shaped, etc.). While the remainder of this description will refer to the tubular body portion 12, it should be appreciated that the features described herein apply equally, mutatis mutandis, to a hollow body portion 12 having any shape or construction.

The tubular body portion 12 further defines an opening or slit 14 that extends in the longitudinal direction. The slit 14 can extend the entire length of the tubular body portion 14 as shown, or alternatively may be located at only a portion of the length of the tubular body portion 14. The tubular body portion 12 can also include a first contact surface 16 and a second contact surface 18 that are separated by the slit 14. The tubular body portion 12 can be constructed to define an interior 20 within which the wire harness assembly can be arranged. As described more fully below, the first and second contact surfaces 16, 18 can be fused together to substantially enclose the wire harness assembly within the interior 20.

Figure 3:
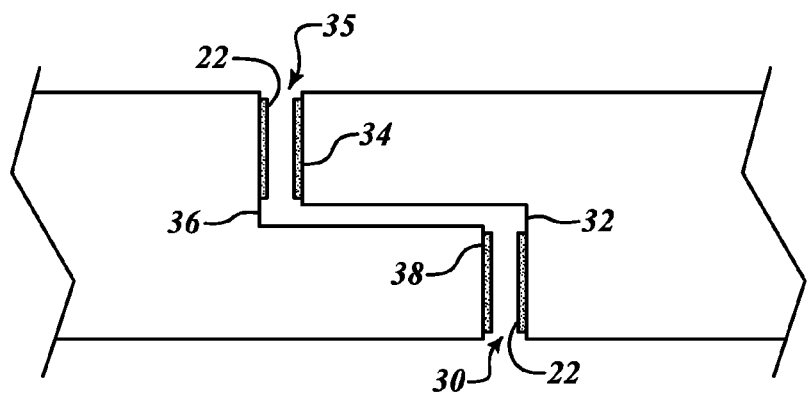
FIG. 3 is a partial cross-sectional view of an example wire harness enclosure showing first and second contact surfaces according to some implementations of the present disclosure.

Various different configurations of the first and second contact surfaces 16, 18 can be utilized. Each configuration can have various advantages in performance and ease of installation. Referring now to the example wire harness enclosure 10 illustrated in FIG. 3, a first contact surface 30 can include a first recessed portion 32 and a first extended portion 34. Similarly, a second contact surface 35 can include a second recessed portion 36 and a second extended portion 38. In this manner, the first and second contact surfaces 30, 35 can be shaped to be complementary. For example, the first extended portion 34 can be coupled to the second recessed portion 36 and the second extended portion 38 can be coupled to the first recessed portion 32 when the first and second contact surfaces 30, 35 are fused. A conductive ink 22 can be coupled to one or more of these portions 32, 34, 36, 38 to ensure proper fusing between the first and second contact surfaces 30, 35.

Figure 4:
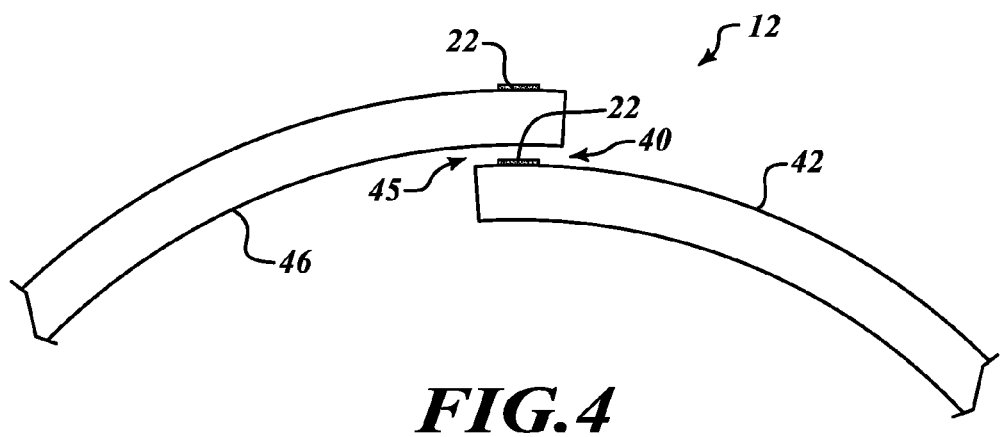
FIG. 4 is a partial cross-sectional view of an example wire harness enclosure showing first and second contact surfaces according to some implementations of the present disclosure.
Figure 5:
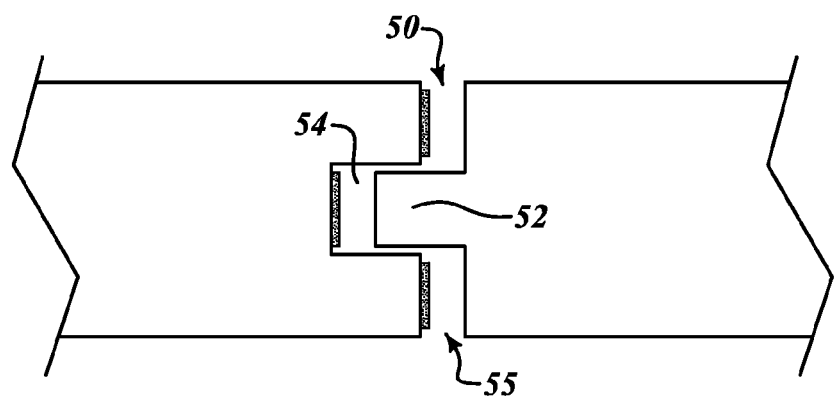
FIG. 5 is a partial cross-sectional view of an example wire harness enclosure showing first and second contact surfaces according to some implementations of the present disclosure.

Referring now to FIG. 4, in an alternative configuration, a first contact surface 40 and a second contact surface 45 can be located on an outer surface 42 and an inner surface 46, respectively, of the tubular body portion 12. A conductive ink 22 can be coupled to one or both of these contact surfaces 40, 45 to ensure proper fusing. In yet another alternative, a first contact surface 50 can include a projection 52 and a second contact surface 55 can define a groove 56 that has a complementary shape to the projection 52. The projection 52 can be arranged within the groove 56 when the first contact surface 50 is fused with the second contact surface 55. While the remainder of this description will refer to the first contact surface 16 and the second contact surface 18, it should be appreciated that the features described herein apply equally, mutatis mutandis, to any of the example configurations of first and second contact surfaces 30, 35, 40, 45, 50, 55 shown in FIGS. 3-5.

In a "relaxed" state (where force is not applied to the wire harness enclosure 10), the tubular body portion 12 can be constructed to be biased to a shape or configuration in which the first and second contact surfaces 16, 18 are in contact or close proximity to each other. In this manner, the first and second contact surfaces 16, 18 can be more easily fused together, e.g., through the application of a magnetic field.

A conductive ink 22 can be coupled to at least one of the first contact surface 16 and the second contact surface 18. It should be appreciated that the conductive ink 22 can be coupled to both the first and second contact surfaces 16, 18, or portions thereof. The conductive ink 22 can, e.g., be a film that includes a layer of ferrous dust. The conductive ink 22 is configured to generate heat when a magnetic field is applied to the conductive ink 22 through induction. For example, a changing magnetic field will generate a current in the conductive ink 22, which can generate the heat.

In some embodiments, the first and second contact surfaces 16, 18 (or portions thereof) can be formed of a material that softens or melts, partially or completely, in response to the heat generated by the conductive ink 22. For example only, the first and second contact surfaces 16, 18 can be formed of a plastic or composite material with a relatively low melting point. When an appropriate magnetic field is applied to the conductive ink 22, the heat generated by the conductive ink 22 can cause one or both of the first and second contact surfaces 16, 18 to soften or melt. Due to the contact and/or proximity of the first and second contact surfaces 16, 18 in the relaxed configuration, when the heat is removed (e.g., when the magnetic field is no longer applied to the conductive ink 22) the material of the first contact surface 16 and/or second contact surfaces 18 can harden to fuse the contact surfaces 16, 18 together at a fused location 60 (see FIG. 6).

The tubular body portion 12 and the first and second contact surfaces 16, 18 can be made of a single material, e.g., a material with a relatively low melting point, as described above. Alternatively, the tubular body portion 12 can be made of one material, and the first and second contact surfaces 16, 18 can be made of a second, different material. In this manner, the softening of the second material of the first and second contact surfaces 16, 18 can be achieved while maintaining the structural rigidity and other characteristics of the first material.

In various embodiments, the conductive ink 22 can include an adhesive or similar material to assist in fusing the first contact surface 16 with the second contact surface 18. The conductive ink 22 can include an adhesive that softens in response to the heat generated by the conductive ink 22, as described above. In these embodiments, the tubular body portion 12 and the first and second contact surfaces 16, 18 may be made of the same or different material, and the material may (or may not) soften or melt in response to the heat generated by the conductive ink 22. For example only, it may be advantageous for the conductive ink 22 to include an adhesive to assist in fusing the first contact surface 16 and the second contact surface 18, even if the first and second contact surfaces 16, 18 also soften or melt in response to heat.

The example wire harness enclosure 10 can be utilized to protect a wire harness assembly, e.g., in a vehicle. A wire harness assembly 70 (see FIG. 6) can be inserted into the interior 20 of the tubular body portion 12 through the slit 14. Once the wire harness assembly 70 is arranged within the interior 20, the tubular body portion 12 in the relaxed state can place the first and second contact surfaces 16, 18 in proximity to (or contact with) each other. An appropriate magnetic field can be applied to the conductive ink 22, which in turn generates heat sufficient to fuse the first contact surface 16 with the second contact surface 18. The fusing of the first contact surface 16 with the second contact surface 18 may enclose the wire harness assembly 70 in the interior 20.

Figure 6:
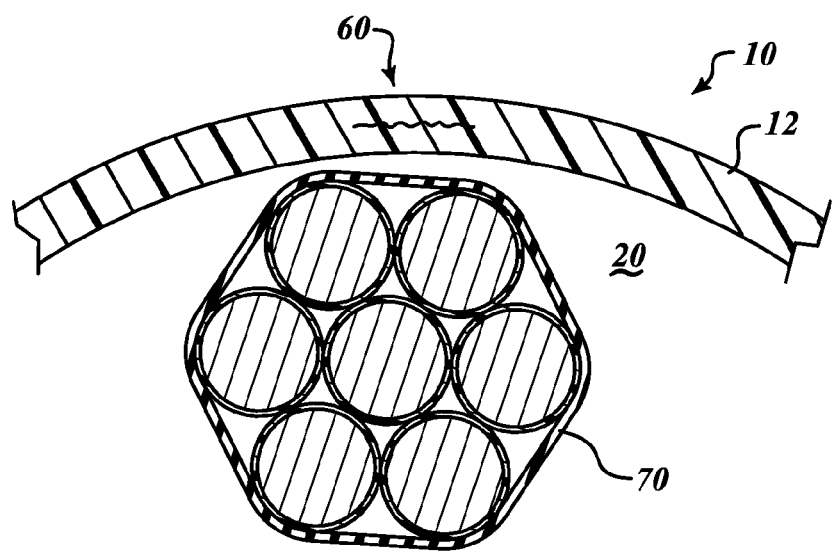
FIG. 6 is a partial cross-sectional view of an example wire harness enclosure showing a first contact surface fused with a second contact surfaces according to some implementations of the present disclosure.

Referring now to FIG. 6, a sectional view of the example wire harness enclosure 10 in the fused configuration is illustrated. A wire harness assembly 70 is shown arranged within the interior 20. The first and second contact surfaces 16, 18 are fused together at the fused location. In some embodiments, the fusing of the first and second contact surfaces 16, 18 act to seal the slit 14 (see FIGS. 1A, 1B and 2). It should be appreciated, however, that sealing of the slit 14 does not necessarily mean sealing in an air-tight or water- or other fluid-tight manner. In the fused configuration, the wire harness enclosure 10 can inhibit or prevent the wire harness assembly 70 from extending through the slit 14, thereby protecting the wire harness assembly 70 from dirt, foreign objects, moisture, and/or damage (e.g., as a result of bending during installation in a vehicle).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An enclosure for a wire harness, comprising:
   a hollow body portion having a length, a first contact surface and a second contact surface, the hollow body portion defining a slit that extends the entire length of the hollow body portion, the slit separating the first contact surface from the second contact surface; and
   a conductive ink coupled to at least one of the first contact surface and the second contact surface, wherein the conductive ink generates heat when an appropriate magnetic field is applied to the conductive ink,
   wherein the first contact surface fuses with the second contact surface upon application of the appropriate magnetic field to the conductive ink.

2. The enclosure of claim 1, wherein the hollow body portion has a substantially circular shaped cross-section.

3. The enclosure of claim 1, wherein the hollow body portion has an oval shaped cross-section.

4. The enclosure of claim 1, wherein the conductive ink includes an adhesive that softens in response to the heat generated by the conductive ink when the appropriate magnetic field is applied such that, when the heat is removed, the first contact surface is fused with the second contact surface.

5. The enclosure of claim 1, wherein the hollow body portion has a tubular structure.

6. The enclosure of claim 5, wherein the first and second contact surfaces are formed of a material that softens in response to the heat generated by the conductive ink when the appropriate magnetic field is applied, wherein the material hardens when the heat is removed such that the first contact surface is fused with the second contact surface.

7. The enclosure of claim 6, wherein the conductive ink includes an adhesive that softens in response to the heat generated by the conductive ink when the appropriate magnetic field is applied such that, when the heat is removed, the first contact surface is fused with the second contact surface.

8. The enclosure of claim 5, wherein the hollow body portion, the first contact surface and the second contact surface are formed of a single material, wherein the first contact surface and the second contact surface soften in response to the heat generated by the conductive ink when the appropriate magnetic field is applied such that, when the heat is removed, the first contact surface is fused with the second contact surface.

9. The enclosure of claim 5, wherein the conductive ink includes an adhesive that softens in response to the heat generated by the conductive ink when the appropriate magnetic field is applied such that, when the heat is removed, the first contact surface is fused with the second contact surface.

10. The enclosure of claim 1, wherein the hollow body portion is a convoluted tube.

11. The enclosure of claim 10, wherein the first and second contact surfaces are formed of a material that softens in response to the heat generated by the conductive ink when the appropriate magnetic field is applied, wherein the material hardens when the heat is removed such that the first contact surface is fused with the second contact surface.

12. The enclosure of claim 11, wherein the conductive ink includes an adhesive that softens in response to the heat generated by the conductive ink when the appropriate magnetic field is applied such that, when the heat is removed, the first contact surface is fused with the second contact surface.

13. The enclosure of claim 10, wherein the hollow body portion, the first contact surface and the second contact surface are formed of a single material, wherein the first contact surface and the second contact surface soften in response to the heat generated by the conductive ink when the appropriate magnetic field is applied such that, when the heat is removed, the first contact surface is fused with the second contact surface.

14. The enclosure of claim 10, wherein the conductive ink includes an adhesive that softens in response to the heat generated by the conductive ink when the appropriate magnetic field is applied such that, when the heat is removed, the first contact surface is fused with the second contact surface.

15. The enclosure of claim 1, wherein the first contact surface is located on an outer surface of the hollow body portion and the second contact surface is located on an inner surface of the hollow body portion.

16. The enclosure of claim 1, wherein the first contact surface includes a first extended portion and a first recessed portion and the second contact surface includes a second extended portion and a second recessed portion, wherein the first extended portion is coupled to the second recessed portion and the first recessed portion is coupled to the second extended portion when the first contact surface is fused with the second contact surface.

17. The enclosure of claim 1, wherein the first contact surface includes a projection and the second contact surface defines a groove, the groove having a complementary shape to the projection, the projection being arranged within the groove when the first contact surface is fused with the second contact surface.

18. The enclosure of claim 1, wherein the first and second contact surfaces are formed of a material that softens in response to the heat generated by the conductive ink when the appropriate magnetic field is applied, wherein the material hardens when the heat is removed such that the first contact surface is fused with the second contact surface.

19. The enclosure of claim 1, wherein the hollow body portion, the first contact surface and the second contact surface are formed of a single material, wherein the first contact surface and the second contact surface soften in response to the heat generated by the conductive ink when the appropriate magnetic field is applied such that, when the heat is removed, the first contact surface is fused with the second contact surface.

20. The enclosure of claim 1, wherein the slit is sealed when the first contact surface is fused with the second contact surface.

* * * * *